(12) United States Patent
Chen et al.

(10) Patent No.: US 9,985,428 B2
(45) Date of Patent: May 29, 2018

(54) SAMPLING IMPLEMENTATION METHOD AND DEVICE BASED ON CONVENTIONAL SAMPLING GOOSE TRIP MODE

(71) Applicants: XJ GROUP CORPORATION, Xuchang, Henan (CN); XJ ELECTRIC CO., LTD, Xuchang, Henan (CN); Xuchang XJ Software Technology Co., Ltd, Xuchang (CN); State Grid Corporation of China, Beijing (CN)

(72) Inventors: Jirui Chen, Xuchang (CN); Maojun Deng, Xuchang (CN); Chuankun Ni, Xuchang (CN); Lijuan Lv, Xuchang (CN); Heke Ma, Xuchang (CN); Dongxiao Yao, Xuchang (CN); Baowei Li, Xuchang (CN); Xu Li, Xuchang (CN); Jidong Huang, Xuchang (CN); Feng Xiao, Xuchang (CN); Shasha Hu, Xuchang (CN); Jingli Zhang, Xuchang (CN); Yingying Xi, Xuchang (CN)

(73) Assignees: XJ Group Corporation, Xuchang, Henan Province (CN); XJ Electric Co., Ltd., Xuchang, Henan Province (CN); Xuchang XJ Software Technology Co., Ltd., Xuchang, Henan Province (CN); State Grid Corporation of China, Beijing (CN)

( * ) Notice: Subject to any disclaimer, the term of this patent is extended or adjusted under 35 U.S.C. 154(b) by 0 days. days.

(21) Appl. No.: 15/261,173

(22) Filed: Sep. 9, 2016

(65) Prior Publication Data
US 2017/0070336 A1   Mar. 9, 2017

(30) Foreign Application Priority Data
Sep. 9, 2015 (CN) .......................... 2015 1 0568540

(51) Int. Cl.
*H02H 7/26* (2006.01)
(52) U.S. Cl.
CPC .................................. *H02H 7/261* (2013.01)
(58) Field of Classification Search
CPC ............................ H04L 7/0008; H04L 69/00
(Continued)

(56) References Cited

U.S. PATENT DOCUMENTS

| 4,932,024 A | * | 6/1990 | Bonicioli | .............. | H04M 9/025 |
| | | | | | 370/458 |
| 5,734,329 A | * | 3/1998 | Khosrowpour | ....... | H04L 12/403 |
| | | | | | 340/12.31 |

(Continued)

FOREIGN PATENT DOCUMENTS

| CN | 203399089 U | 1/2014 |
| CN | 104701979 A | 6/2015 |

OTHER PUBLICATIONS

Notification of the First Office Action of Chinese application No. 201510568540.4, dated Dec. 21, 2016.
(Continued)

*Primary Examiner* — Emmanuel Bayard
(74) *Attorney, Agent, or Firm* — LeClairRyan PLLC

(57) ABSTRACT

Sampling implementation method and device based on conventional sampling GOOSE trip mode. CPU of master NPI plug-in, after receiving a second pulse, transmits sampling pulse generation time and a transmission enable bit to FPGA of the master NPI plug-in at a fixed interval; after detecting the transmission enable bit, the FPGA of the master NPI plug-in judges whether time of its internal timer is greater than/equal to the sampling pulse generation time, if yes, generates a sampling pulse to FPGA of collection plug-in; after receiving sampling pulse, the collection plug-in carries out A/D sampling, and transmits sampled data to (Continued)

the master NPI plug-in; when detecting that all A/D samplings are completed, the master NPI plug-in transmits data packets to protection CPU plug-in. The device includes an MMI plug-in, a protection CPU plug-in, a master NPI plug-in and a collection plug-in. Protection maloperation is thereby reduced.

9 Claims, 4 Drawing Sheets

(58) Field of Classification Search
USPC .................................. 375/219–222, 356–359
See application file for complete search history.

(56) References Cited

U.S. PATENT DOCUMENTS

| | | | | |
|---|---|---|---|---|
| 2004/0028412 A1* | 2/2004 | Murphy | .............. | H04B 10/801 398/135 |
| 2004/0037558 A1* | 2/2004 | Beshai | .............. | H04Q 11/0005 398/57 |
| 2005/0044214 A1* | 2/2005 | Schwertfuehrer | ...... | H04L 29/06 709/224 |
| 2006/0290770 A1* | 12/2006 | LeBlanc | ................... | B41J 2/37 347/188 |
| 2008/0107136 A1* | 5/2008 | Joo | ........................ | H04L 12/64 370/503 |
| 2008/0186906 A1* | 8/2008 | Defrance | ............. | H04J 3/0697 370/324 |
| 2010/0158164 A1* | 6/2010 | Oh | ........................ | H04L 25/068 375/343 |
| 2010/0199009 A1* | 8/2010 | Koide | .................. | H04L 1/0079 710/110 |
| 2010/0318860 A1* | 12/2010 | Ohbi | ..................... | H04N 5/765 714/700 |
| 2011/0148850 A1* | 6/2011 | Kadota | ................ | G09G 3/3685 345/213 |
| 2011/0158263 A1* | 6/2011 | Karino | ................ | H02H 1/0084 370/503 |
| 2012/0054517 A1* | 3/2012 | Fuh | ...................... | G06F 1/3287 713/320 |
| 2012/0265360 A1* | 10/2012 | Smit | ........................ | G05F 1/66 700/293 |
| 2012/0278421 A1* | 11/2012 | Sun | ......................... | H04Q 9/00 709/208 |
| 2013/0278191 A1* | 10/2013 | Zushi | .................... | H02H 7/122 318/400.22 |
| 2014/0022185 A1* | 1/2014 | Ribeiro | ................ | G06F 3/0412 345/173 |
| 2014/0023048 A1* | 1/2014 | Vu | ........................... | H04B 7/26 370/336 |
| 2014/0025321 A1* | 1/2014 | Spanier | ............... | G01R 21/133 702/62 |
| 2014/0050232 A1* | 2/2014 | Hirose | ................. | H04J 3/0667 370/503 |
| 2014/0082251 A1* | 3/2014 | Li | ....................... | G06F 13/4022 710/316 |
| 2014/0115344 A1* | 4/2014 | Maier | .................... | G06F 13/40 713/189 |
| 2014/0331075 A1* | 11/2014 | Morris | .................... | G06F 1/04 713/502 |
| 2015/0324270 A1* | 11/2015 | Li | ........................ | H04L 12/413 710/17 |
| 2016/0132444 A1* | 5/2016 | Jaraudias | ............. | H04L 49/109 710/308 |
| 2016/0239449 A1* | 8/2016 | Hapke | ...................... | G06F 1/12 |
| 2016/0330793 A1* | 11/2016 | Zhuge | ...................... | G06F 1/12 |

OTHER PUBLICATIONS

Wang et al., "Practical research on point to point model of bus protection in smart substation", Oct. 1, 2011.

Bao-Wei et al., "Research of the sample synchronization scheme for optical differential protection based on sampled value transmit by network in smart substation", May 1, 2013.

* cited by examiner

SAMPLING IMPLEMENTATION METHOD AND DEVICE BASED ON CONVENTIONAL SAMPLING GOOSE TRIP MODE

This application claims the benefit of China Patent Application Serial No. 201510568540.4 filed Sep. 9, 2015, which is hereby incorporated by reference in its entirety.

FIELD

The present disclosure belongs to the technical field of power system relay protection, and specifically relates to a sampling implementation method and device based on a conventional sampling Generic Object Oriented Substation Events (GOOSE) trip mode.

BACKGROUND

As protection maloperation caused by digital sampling in electronic inductors, collector circuits and merging units of smart transformer substations become more and more frequent, and fault location and analysis is difficult for a Sampled Value (SV) digital sampling circuit, the digital sampling becomes significantly inferior to conventional sampling.

For example, Chinese patent No: 201410667282.0 titled "Protection Measurement and Control Integrated Device and Protection Measurement and Control Method" discloses a protection measurement and control integrated device, including a Man Machine Interface (MMI) plug-in, a New Process layer Interface (NPI) plug-in, a protection Central Processing Unit (CPU), a measurement and control CPU and an Input/Output (I/O) plug-in, wherein the NPI plug-in is used for receiving sampled data and GOOSE information from a merging unit. It can be seen that the sampled data provided for logical judgment of the protection device is from the merging unit, and thus protection maloperation caused by the digital sampling also exists.

In addition, chassis sampling in a conventional sampling GOOSE trip mode uses single-protection CPU operation mode, and reliability of a protection sampling circuit is not high, thereby easily causing protection maloperation.

SUMMARY

The present disclosure provides a sampling implementation method and device based on a conventional sampling GOOSE trip mode, to solve the problem of protection maloperation caused by unreliable sampled data, when existing protection device carries out logical judgment on data that is digitally sampled using the electronic transformer, the collector circuit and the merging unit circuit.

To solve the above technical problem, sampling implementation method based on the conventional sampling GOOSE trip mode according to the present disclosure includes:

1) transmitting, by a Central Processing Unit (CPU) of a master NPI plug-in after receiving a second pulse, sampling pulse generation time and a transmission enable bit to a Field Programmable Gate Array (FPGA) of the master NPI plug-in at a fixed interval;

2) judging, by the FPGA of the master NPI plug-in after detecting the transmission enable bit, whether time of an internal timer of the FPGA of the master NPI plug-in is greater than or equal to the sampling pulse generation time, if more than or equal to, generating a sampling pulse to an FPGA of a collection plug-in, and at the same time resetting the transmission enable bit;

3) carrying out Analog-to-Digital (A/D) sampling by the collection plug-in after receiving the sampling pulse of master NPI plug-in, and packing sampled data and transmitting data packets to the master NPI plug-in;

4) transmitting, by the FPGA of the master NPI plug-in when detecting that all the A/D samplings are completed, a sampling completion identifier to the CPU unit of the master NPI plug-in, and transmitting the data packets to a protection CPU plug-in for logical judgment.

The sampling implementation method based on the conventional sampling GOOSE trip mode of claim 1, wherein when there are many analog quantity collection circuits, a slave NPI plug-in is provided, the CPU of the master NPI plug-in and that of the slave NPI plug-in receive the second pulse simultaneously, carry out the A/D sampling following the Steps 1)-3); FPGA of the master/slave NPI plug-in, when detecting that all the A/D sampling are completed, transmits the sampling completion identifier to the CPU of the master/slave NPI plug-in, caches the data packets, which, after the data sampling of the master NPI plug-in is synchronized with that of the slave NPI plug-in, are transmitted to the protection CPU plug-in together for logical judgment.

When A/D sampling is carried out, double A/D sampling is used.

SV digital sample is compatible through assembling plug-ins.

The 1PPS-pulse received by the CPU of the master NPI plug-in is generated by a clock crystal oscillation source of the protection CPU plug-in per se, or is provided by an external electric B code clock source.

The fixed interval in the Step 1) is 0.833 seconds

The sampling device based on a conventional sampling GOOSE trip mode according to the present disclosure includes: an MMI plug-in, a protection CPU plug-in and a master NPI plug-in, the device further includes a collection plug-in.

The device further includes a pulse extension plug-in, which is an optical-electric conversion module.

For each collection channel, the collection plug-in is provided with two A/D samplers.

In the sampling implementation method based on the conventional sampling GOOSE trip mode according to the present disclosure, the CPU of the master NPI plug-in, after receiving the second pulse, transmits the time required for generating the sampling pulse to an FPGA unit of the master NPI plug-in; when receiving the sampling pulse transmitted by the FPGA of the master NPI, FPGA of the collection plug-in quickly drives the sampling of all analog quantity channels of an AD chip, packs and transmits data to the master NPI by means a serial bus; when detecting that all data sampling is completed, the FPGA of the master NPI transmits the sampling completion identifier to the CPU unit, and transparently transmits all data packets to the protection CPU. The method can sample analog data for logical judgment; compared with existing digital sampling method using the electronic transformer, the collector circuit and the merging unit circuit, the method according to the present disclosure reduces occurring of protection maloperation.

The method according to the present disclosure uses double AD sampling, thereby improving the reliability of homology data sampling and avoiding protection maloperation caused by abnormity of the sampling circuit.

BRIEF DESCRIPTION OF THE DRAWINGS

FIG. 4 is a diagram of generation principle of sampling pulse of NPI plug-in.

DETAILED DESCRIPTION

Technical scheme of the present disclosure is further described in detail in combination with the drawings.

Figure 1:
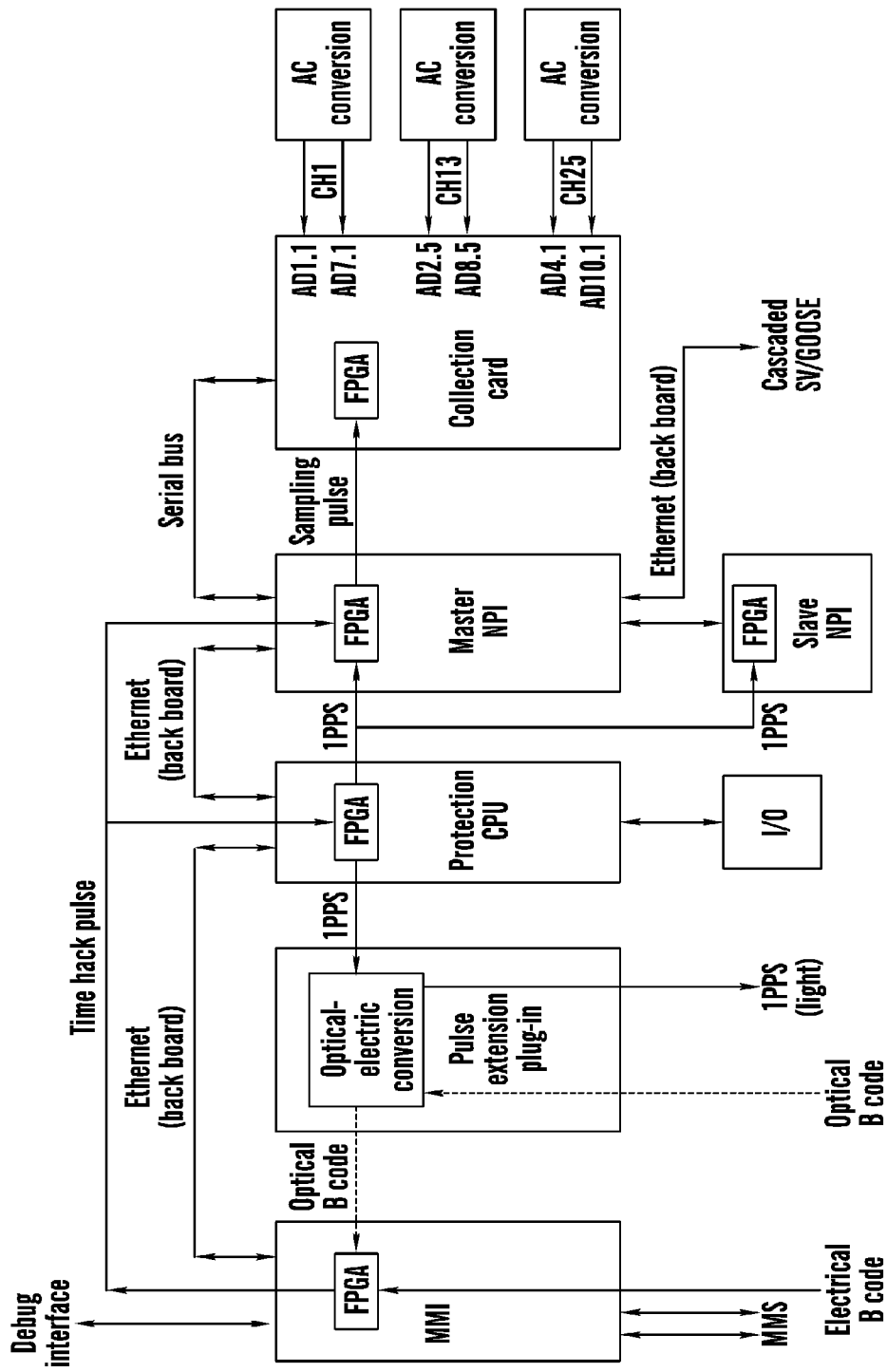
FIG. 1 is a diagram of integral sampling circuit of a conventional sampling GOOSE trip main chassis.

Embodiment of the sampling implementation method based on the conventional sampling GOOSE trip mode In the embodiment, the sampling implementation method based on conventional sampling GOOSE trip mode is applied in a high voltage relay protection device of conventional sampling GOOSE trip, where analog sampling of the collection plug-in is implemented by the NPI under control of a 1PPS-pulse issued by the protection CPU; and in addition, reliability of sampling is improved by double AD circuit sampling. The sampling circuit of main chassis is shown in FIG. 1.

Figure 2:
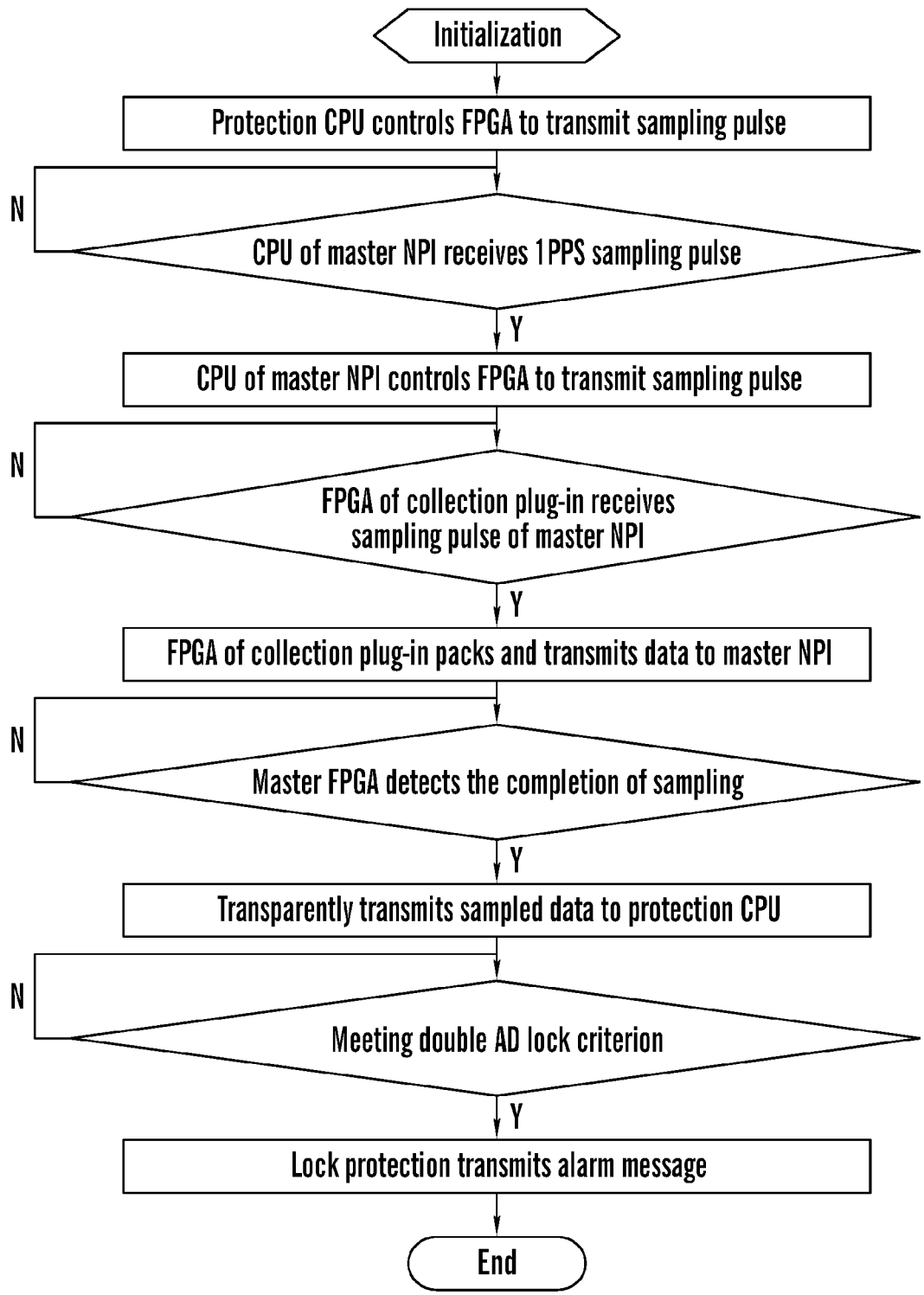
FIG. 2 is a flowchart of a sampling implementation method based on a conventional sampling GOOSE trip mode.

As shown in FIG. 2, the sampling implementation method based on the conventional GOOSE trip mode of the embodiment includes steps as follows:

1) After receiving a second pulse, CPU of the master NPI plug-in transmits sampling pulse generation time and a transmission enable bit to FPGA of the master NPI plug-in at a fixed interval;

2) After detecting the transmission enable bit, FPGA of the master NPI plug-in judges whether time of internal timer of FPGA of an NPI plug-in is greater than/equal to the sampling pulse generation time, if yes, generates a sampling pulse to FPGA of a collection plug-in, and at the same time resets the transmission enable bit;

3) After receiving sampling pulse of the master NPI plug-in, the collection plug-in carries out A/D sampling, and packs sampled data and transmits data packets to the master NPI plug-in;

4) When detecting that all the A/D samplings are completed, FPGA of the master NPI plug transmits a sampling completion identifier to CPU unit of the master NPI, and transmits data packets to the protection CPU plug-in, for logical judgment.

In the embodiment, the 1PPS-second-pulse generation source can be provided by an external electric B code clock source, or a clock crystal oscillation source in the protection CPU plug-in per se. The above steps are described in detail herein by taking the clock crystal oscillation source in the protection CPU plug-in per se as the 1PPS-second-pulse generation source:

For Step (1), the main chassis directly transmits the 1PPS pulse to CPU unit of the master NPI plug-in via FPGA of the protection CPU through Ethernet of back board of the device; after CPU unit of the master NPI receives a time stamp of the 1PPS pulse, it first records the time stamp of the 1PPS pulse, and then controls the CPU unit to transmit the sampling pulse generation time and the transmission enable bit to FPGA of the master NPI at a fixed interval of 0.833 seconds; in other embodiments, other time intervals can be selected as the fixed time interval as needed.

For Step (2), after FPGA of the master NPI detects a transmission enable bit of sampling pulse, it starts judgment; when time of internal timer of the FPGA is greater than the sampling pulse generation time, immediately generates a sampling pulse to FPGA of the collection plug-in, and at the same time resets the transmission enable bit.

For Step (3), after the collection plug-in receives sampling pulse of the master NPI plug-in, immediately samples all ADs, packs sampled data of all analog channels, and then transmits the data packets to the master NPI plug-in.

For Step (4), when FPGA of the master NPI detects that all AD samplings are completed, transmits the sampling completion identifier to the CPU unit, and at the same time transparently transmits the data packets to the protection CPU plug-in through Ethernet of back board, for logical judgment.

In the embodiment, if there are many analog quantity sampling circuits, extension sub chassis can be configured for the solution; pulse extension plug-in of the main chassis and pulse extension plug-in of the sub chassis are connected through a multi-mode optical fiber, and 1PPS pulse signal of the protection CPU is transmitted to CPU unit of the master NPI plug-in of the sub chassis.

As shown in FIG. 2, pulse extension plug-in of the main chassis mainly accomplishes conversion of the PPS pulse signal to an optical signal from an electrical level signal; pulse extension plug-in of the sub chassis mainly accomplishes conversion of the 1PPS pulse signal to an electrical level signal from an optical signal.

In the embodiment, if the sub chassis is configured, the sub chassis can obtain sampled data according to the above Steps 1)-3). For Step 4), master NPI of the sub chassis transmits, through external cascaded fiber, data packet of the master NPI of sub chassis, to the master NPI of the main chassis, FPGA of the master NPI plug-in of main chassis recognizes the cascaded mode by means of the configuration file, and caches the sampled data of the master NPI plug-in, which, after being synchronized with data sampling of the sub chassis, are transparently transmitted to the protection CPU together.

In the embodiment, analog data are sampled by using a double A/D sampling method, after protection CPU receives the double A/D sampled data, calculates sampling amplitudes of two homologous ADs by using a Fourier filter algorithm, checks whether two channels of the sampled data are abnormal by using a preset double AD criterion, if the two channels of AD sampled data meet an error precision, the related protection is open; if the two channels of AD sampled data exceeds the error precision, the related protection is locked, and a double alarm message is issued.

Wherein, formula of the preset double AD criterion is as follows:

$$\begin{cases} |AD1 - AD2| > 0.1 I_n \\ AD1 > 1.2 AD2 \text{ or } AD1 < 0.8 AD2 \end{cases} \quad \text{Formula (1)}$$

$$\begin{cases} |AD1 - AD2| > 0.1 U_{\varphi n} \\ AD1 > 1.2 AD2 \text{ or } AD1 < 0.8 AD2 \end{cases} \quad \text{Formula (2)}$$

Formula (1) is current double AD criterion, Formula (2) is voltage double AD criterion, $I_n$ is rated current, $U_{\varphi n}$ is rated phase voltage, AD1, AD2 are amplitudes of the two channels of AD data respectively.

Judgment precision of the double A/D is mainly based on sampling accuracy of the Steps (1), (2), (3) and (4), otherwise, the related protection is directly locked to avoid protection maloperation.

Figure 3:
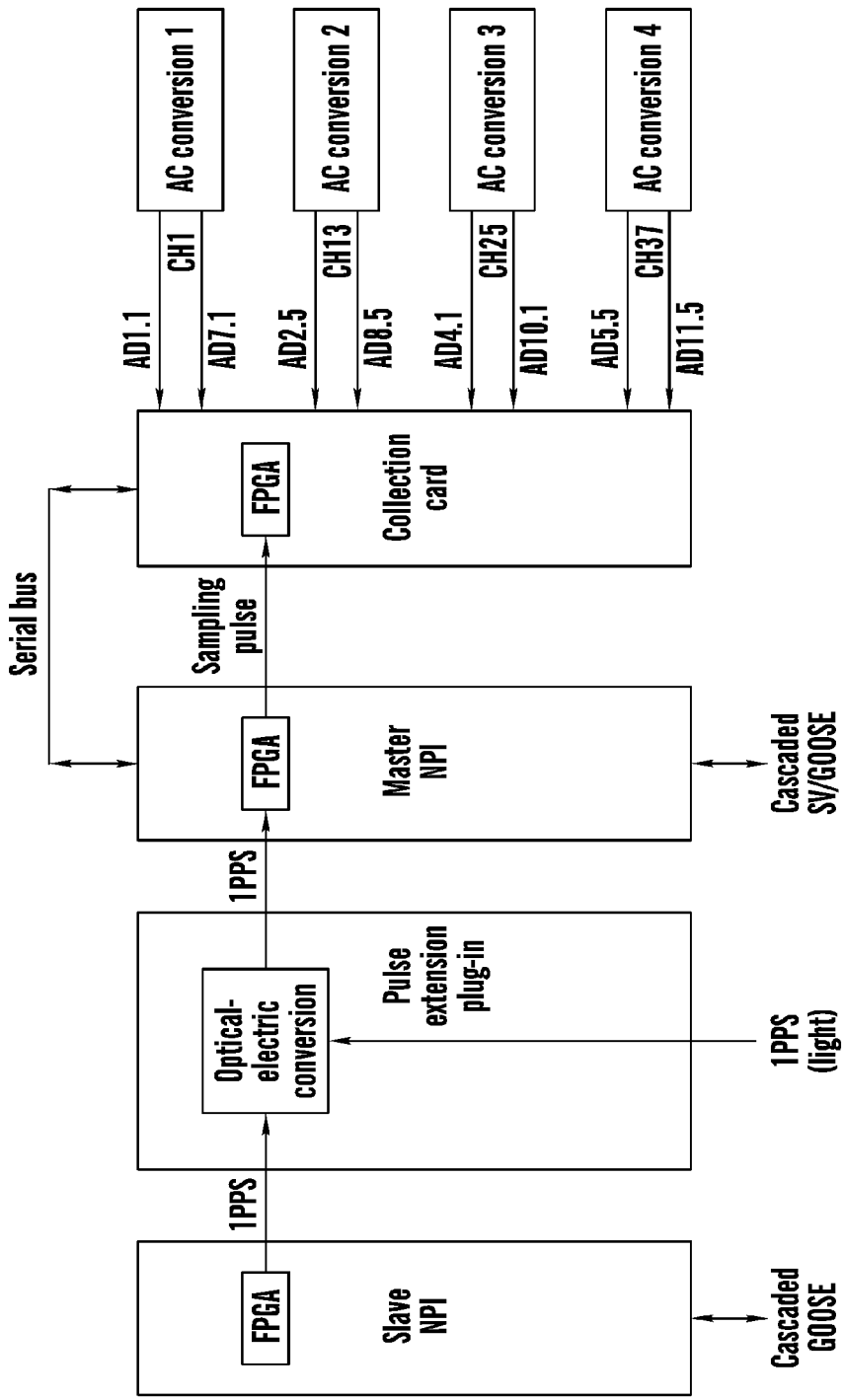
FIG. 3 is a diagram of a sampling circuit of a conventional sampling GOOSE trip sub chassis.
Figure 4:
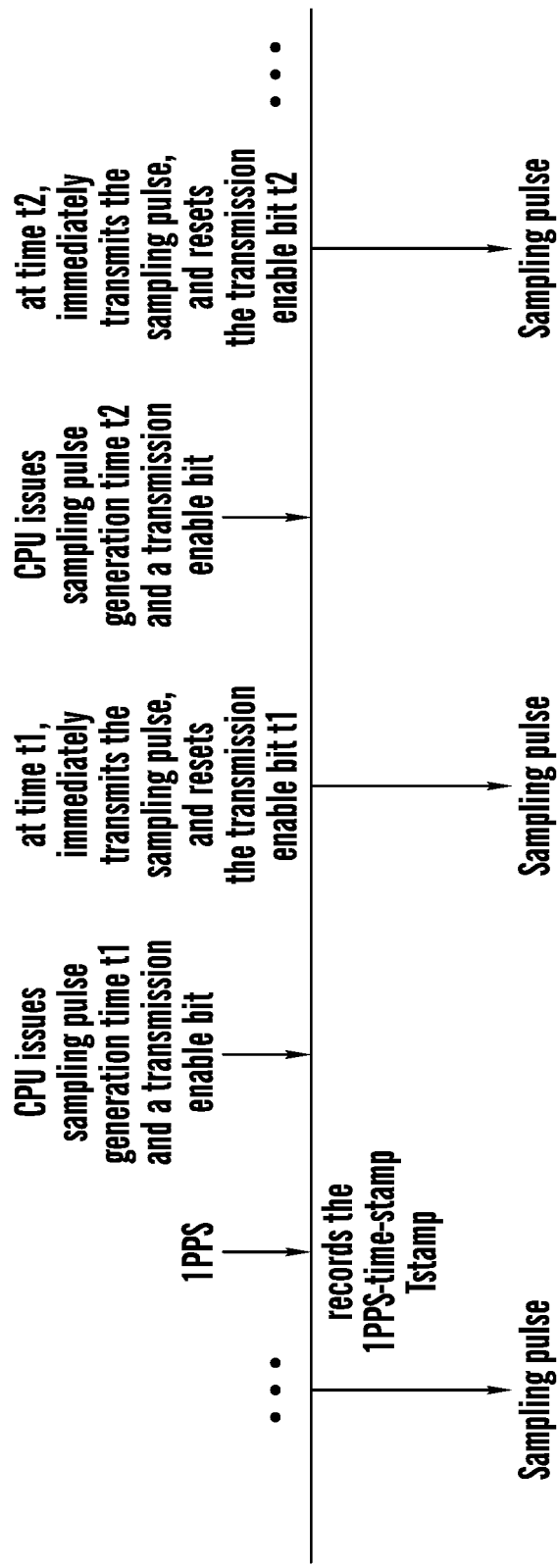

Sampling implementation method based on the conventional sampling GOOSE trip mode in the embodiment not only can implement conventional sampling, but also can accommodate SV digital sampling, sampling principle is simple for implementation. In addition, the problem, caused by different voltage levels and different objects of protection, can be solved by extension of the sub chassis. The sampling circuit of the sub chassis is shown in FIG. 3. The principle that the master NPI controls the collection plug-in to perform sampling by using the 1PPS pulse is shown in FIG. 4.

Embodiment of the sampling device based on the conventional sampling GOOSE trip mode.

The embodiment provides a sampling device used for the above sampling implementation method, including the MMI plug-in, the protection CPU plug-in and the master NPI plug-in, and further including the collection plug-in. The above sampling implementation method can be referred to for the specific connection relations and functions, which are not elaborated herein.

The above Steps (1), (2), (3) and (4) mainly depend on processing capabilities of CPU and FPGA processing units of the NPI plug-in, the collection plug-in and the protection CPU plug-in, and suitable processing units should be selected according to actual situation of the device.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A sampling implementation method based on a conventional sampling Generic Object Oriented Substation Events (GOOSE) trip mode, comprising:
   1) transmitting, by a Central Processing Unit (CPU) of a master New Process layer Interface (NPI) plug-in after receiving a one-pulse-per-second (1PPS) pulse, sampling pulse generation time and a transmission enable bit to a Field Programmable Gate Array (FPGA) of the master NPI plug-in at a fixed interval;
   2) judging, by the FPGA of the master NPI plug-in after detecting the transmission enable bit, whether time of an internal timer of the FPGA of the master NPI plug-in is greater than or equal to the sampling pulse generation time, if more than or equal to, generating a sampling pulse to an FPGA of a collection plug-in, and at the same time resetting the transmission enable bit;
   3) carrying out Analog-to-Digital (A/D) sampling by the collection plug-in after receiving the sampling pulse of master NPI plug-in, and packing sampled data and transmitting data packets to the master NPI plug-in;
   4) transmitting, by the FPGA of the master NPI plug-in when detecting that all the A/D samplings are completed, a sampling completion identifier to the CPU unit of the master NPI plug-in, and transmitting the data packets to a protection CPU plug-in for logical judgment.

2. The sampling implementation method based on the conventional sampling GOOSE trip mode of claim 1, wherein when there are many analog quantity collection circuits, a slave NPI plug-in is provided, the CPU of the master NPI plug-in and that of the slave NPI plug-in receive the 1PPS pulse simultaneously, carry out the A/D sampling following the Steps 1) to 3); FPGA of the master/slave NPI plug-in, when detecting that all the A/D samplings are completed, transmits the sampling completion identifier to the CPU of the master/slave NPI plug-in, caches the data packets, which, after the data sampling of the master NPI plug-in is synchronized with that of the slave NPI plug-in, are transmitted to the protection CPU plug-in together for logical judgment.

3. The sampling implementation method based on the conventional sampling GOOSE trip mode of claim 1, wherein when carrying out the A/D sampling, double A/D sampling is used.

4. The sampling implementation method based on the conventional sampling GOOSE trip mode of claim 1, wherein SV digital sampling is compatible by assembling plug-ins.

5. The sampling implementation method based on the conventional sampling GOOSE trip mode of claim 1, wherein the 1PPS-pulse received by the CPU of the master NPI plug-in is generated by a clock crystal oscillation source of the protection CPU plug-in per se, or is provided by an external electric B code clock source.

6. The sampling implementation method based on the conventional sampling GOOSE trip mode of claim 1, wherein the fixed internal in the Step 1) is 0.833 seconds.

7. A sampling device based on a conventional sampling GOOSE trip mode for implementing the method of claim 1, comprising a Man Machine Interface (MMI) plug-in, a protection CPU plug-in and a master NPI plug-in, wherein the device further comprises a collection plug-in.

8. The sampling device based on the conventional sampling GOOSE trip mode according to claim 7, wherein the device further comprises a pulse extension plug-in, which is an optical-electric conversion module.

9. The sampling device based on the conventional sampling GOOSE trip mode according to claim 7, wherein for each collection channel, the collection plug-in is provided with two A/D samplers.

* * * * *